(12) United States Patent
Gordon et al.

(10) Patent No.: US 11,343,613 B2
(45) Date of Patent: May 24, 2022

(54) PRIORITIZING DELIVERY OF LOCATION-BASED PERSONAL AUDIO

(71) Applicant: Bose Corporation, Framingham, MA (US)

(72) Inventors: John Gordon, Lexington, MA (US); Santiago Carvajal, West Newton, MA (US); Glenn Gomes-Casseres, Framingham, MA (US); Todd Richard Reily, North Reading, MA (US); Conor Sheehan, Brookline, MA (US); Neil Adam Ranney, Boston, MA (US)

(73) Assignee: Bose Corporation, Framingham, MA (US)

( * ) Notice: Subject to any disclaimer, the term of this patent is extended or adjusted under 35 U.S.C. 154(b) by 39 days.

(21) Appl. No.: 16/296,637

(22) Filed: Mar. 8, 2019

(65) Prior Publication Data

US 2019/0281389 A1    Sep. 12, 2019

Related U.S. Application Data

(60) Provisional application No. 62/640,427, filed on Mar. 8, 2018.

(51) Int. Cl.
*H04R 5/04* (2006.01)
*G06F 16/687* (2019.01)
(Continued)

(52) U.S. Cl.
CPC ............... *H04R 5/04* (2013.01); *G06F 3/013* (2013.01); *G06F 3/017* (2013.01); *G06F 3/167* (2013.01);
(Continued)

(58) Field of Classification Search
CPC .. G06Q 30/0261; H04W 4/021; H04W 4/029; H04W 1/022; H04L 67/22; G06F 16/909; H04M 3/4936
See application file for complete search history.

(56) References Cited

U.S. PATENT DOCUMENTS 6,396,509 B1 * 5/2002 Cheng ..................... G06F 3/011
715/706
7,526,378 B2 4/2009 Genz
(Continued)

OTHER PUBLICATIONS

International Search Report & Written Opinion; PCT/US2019/021321; dated May 31, 2019; 12 pages.

*Primary Examiner* — Matthew A Eason
*Assistant Examiner* — Kuassi A Ganmavo
(74) *Attorney, Agent, or Firm* — Fish & Richardson P.C.

(57) ABSTRACT

The technology described in this document can be embodied in a computer-implemented method of controlling a wearable audio device configured to provide an audio output. The method includes receiving data indicating the wearable audio device is proximate a geographic location associated with a localized audio message, and determining that the localized audio message has a higher priority compared to at least one other localized audio message associated with another geographical location proximate to the wearable audio device. The method also includes, responsive to determining that the localized audio message has the higher priority, providing a prompt to initiate playback of the localized audio message with the higher priority to a user of the wearable audio device, and initiating playback of the localized audio message with the higher priority at the wearable audio device in response to actuation of the prompt by the user.

19 Claims, 4 Drawing Sheets (51) Int. Cl.
  *G06F 16/635*  (2019.01)
  *G06F 9/54*    (2006.01)
  *G06F 3/01*    (2006.01)
  *G10L 15/00*   (2013.01)
  *G06F 3/16*    (2006.01)
  *G10L 13/00*   (2006.01)

(52) U.S. Cl.
  CPC ............ *G06F 9/542* (2013.01); *G06F 16/635* (2019.01); *G06F 16/687* (2019.01); *G10L 13/00* (2013.01); *G10L 15/005* (2013.01)

(56) References Cited

U.S. PATENT DOCUMENTS

| | | | |
|---|---|---|---|
| 10,194,259 B1 | 1/2019 | Martin et al. | |
| D864,283 S | 10/2019 | Williams et al. | |
| 10,869,154 B2 | 12/2020 | Bruser et al. | |
| 2003/0098892 A1* | 5/2003 | Hiipakka | H04M 1/72547 715/846 |
| 2004/0133426 A1* | 7/2004 | Kimura | G10L 21/0208 704/272 |
| 2006/0184538 A1* | 8/2006 | Randall | G06F 16/436 |
| 2007/0133757 A1* | 6/2007 | Girouard | H04M 3/436 379/67.1 |
| 2007/0161382 A1* | 7/2007 | Melinger | H04L 67/18 455/456.1 |
| 2007/0182532 A1* | 8/2007 | Lengning | G10H 1/0041 340/439 |
| 2009/0238386 A1 | 9/2009 | Usher et al. | |
| 2010/0204987 A1* | 8/2010 | Miyauchi | G10L 15/25 704/233 |
| 2011/0300833 A1 | 12/2011 | Shaw | |
| 2012/0218296 A1* | 8/2012 | Belimpasakis | G06Q 30/0261 345/633 |
| 2012/0221687 A1* | 8/2012 | Hunter | G06F 16/435 709/219 |
| 2012/0323933 A1* | 12/2012 | He | G06Q 10/107 707/749 |
| 2013/0116919 A1* | 5/2013 | Furuhata | G08G 1/096741 701/408 |
| 2013/0121503 A1* | 5/2013 | Ankolekar | H04W 4/18 381/77 |
| 2013/0316679 A1 | 11/2013 | Miller et al. | |
| 2014/0277639 A1 | 9/2014 | Gomes-Casseres et al. | |
| 2014/0277644 A1 | 9/2014 | Gomes-Casseres et al. | |
| 2015/0006278 A1* | 1/2015 | Di Censo | G06Q 30/0244 705/14.43 |
| 2015/0181382 A1* | 6/2015 | McDonald | H04L 67/18 455/456.3 |
| 2015/0235398 A1* | 8/2015 | Kim | G06F 3/011 345/633 |
| 2015/0269166 A1* | 9/2015 | Nissen | G06F 16/444 707/724 |
| 2015/0289217 A1* | 10/2015 | Ban | H04W 56/001 455/41.2 |
| 2016/0094940 A1* | 3/2016 | Vigier | H04W 4/80 455/456.3 |
| 2016/0105757 A1* | 4/2016 | Vennstrom | H04S 7/307 381/303 |
| 2016/0259977 A1* | 9/2016 | Asbun | G16H 40/67 |
| 2016/0284126 A1* | 9/2016 | Leppanen | G06F 3/013 |
| 2017/0098466 A1 | 4/2017 | Elliot et al. | |
| 2017/0171261 A1* | 6/2017 | Smus | H04N 7/15 |
| 2017/0180882 A1* | 6/2017 | Lunner | A61B 5/04842 |
| 2017/0257723 A1 | 9/2017 | Morishita et al. | |
| 2018/0137801 A1* | 5/2018 | An | G06F 3/013 |
| 2019/0012902 A1* | 1/2019 | Kumar | G08B 25/10 |

\* cited by examiner

PRIORITIZING DELIVERY OF LOCATION-BASED PERSONAL AUDIO

CLAIM TO PRIORITY

This application claims priority to provisional U.S. patent application 62/640,427, filed Mar. 8, 2018, the entire contents of which are incorporated herein.

TECHNICAL FIELD

This disclosure generally relates to audio devices. More particularly, the disclosure relates to audio devices, such as wearable audio devices, including a location based audio module for providing location-specific audio to the user at the wearable audio device.

BACKGROUND

Various types of portable speaker devices such as headphones or other wearable acoustic devices are used for listening to music and other audio. These devices can be connected with a source device such as a smartphone, which provides geo-location information associated with the user.

SUMMARY

In one aspect, this document features a computer-implemented method of controlling a wearable audio device configured to provide an audio output. The method includes receiving data indicating the wearable audio device is proximate a geographic location associated with a localized audio message, and determining that the localized audio message has a higher priority compared to at least one other localized audio message associated with another geographical location proximate to the wearable audio device. The method also includes, responsive to determining that the localized audio message has the higher priority, providing a prompt to initiate playback of the localized audio message with the higher priority to a user of the wearable audio device, and initiating playback of the localized audio message with the higher priority at the wearable audio device in response to actuation of the prompt by the user.

In another aspect, this disclosure features a computing device that includes memory and one or more processing devices. The one or more processing devices are configured to receive data indicating the wearable audio device is proximate a geographic location associated with a localized audio message, and determine that the localized audio message has a higher priority compared to at least one other localized audio message associated with another geographical location proximate to the wearable audio device. The one or more processing devices are also configured to provide, responsive to determining that the localized audio message has the higher priority, a prompt to initiate playback of the higher prioritized localized audio message with the higher priority to a user of the wearable audio device, and initiate playback of the higher prioritized localized audio message with the higher priority at the wearable audio device in response to actuation of the prompt by the user.

Implementations of the above aspects can include one or more of the following features. The localized audio message can be prioritized based upon user-preferences. The localized audio message can be prioritized based upon a geo-location of a user of the wearable audio device. The localized audio message can be prioritized based upon an effective operational radius. Determining the priority of the localized audio message can be repeated based upon movement of the user of the wearable audio device. The localized audio message can be prioritized based upon a user interface provided the wearable audio device. The localized audio message can be prioritized based upon a predefined limit of localized audio messages to be received by the wearable audio device. The localized audio message can be prioritized based upon a direction of gaze of the user of the wearable audio device. The localized audio message can be prioritized based upon a line of sight of the user of the wearable audio device. The localized audio message can be prioritized based upon a language spoken by the user of the wearable audio device. The localized audio message can be prioritized based upon one or more habits of the user of the wearable audio device as determined by a machine-learning process.

Two or more features described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a directional audio selection system can be beneficially incorporated into a wearable audio device to provide for added functionality. For example, a directional audio selection system can enable, among other things, audio source selection using gestures or inertial commands.

Commonly labeled components in the FIGURES are considered to be substantially equivalent components for the purposes of illustration, and redundant discussion of those components is omitted for clarity.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be acoustically presented with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of personal audio devices, such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses or other head-mounted audio devices. It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

Figure 1:
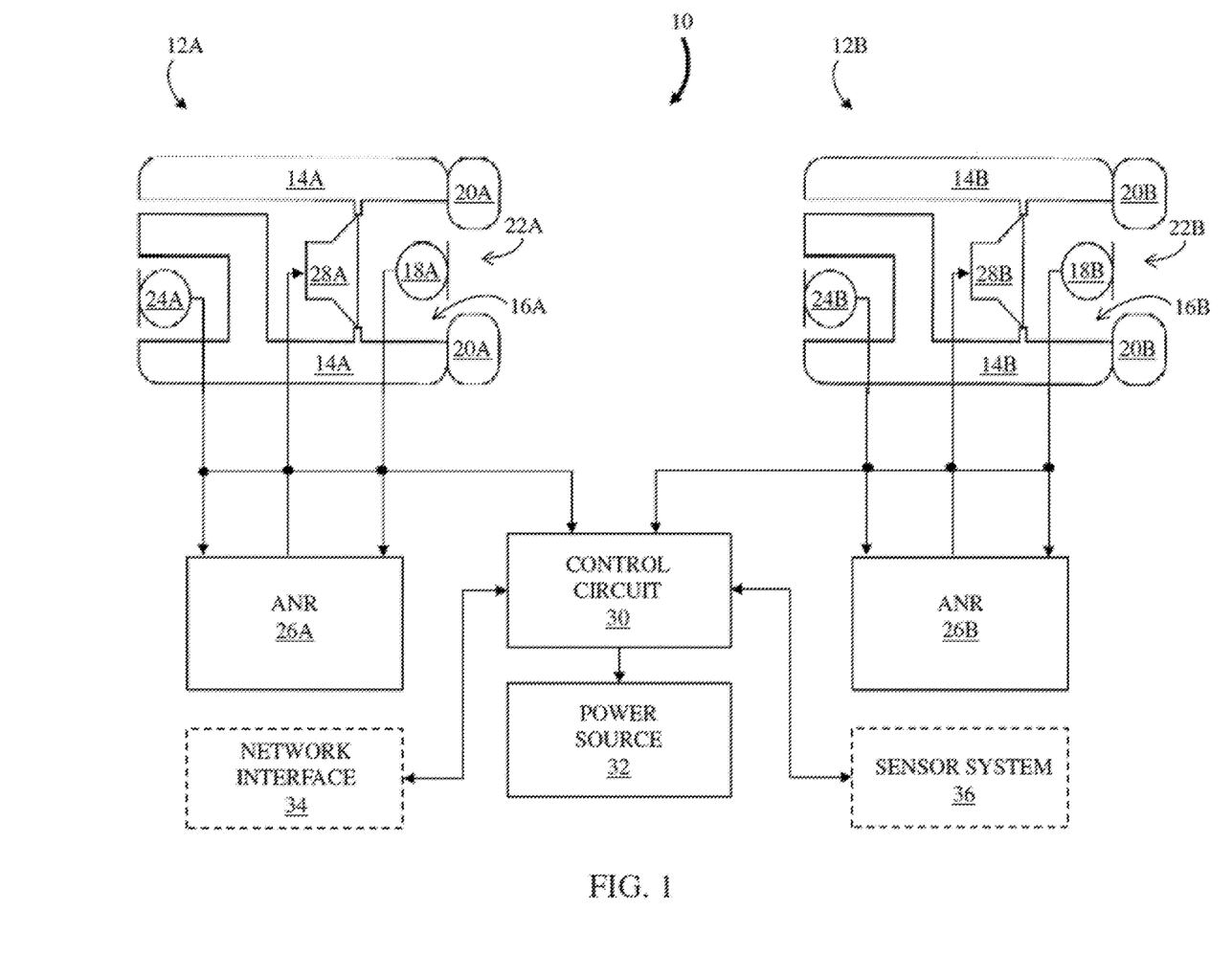
FIG. 1 is a block diagram depicting an example personal audio device according to various disclosed implementations.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices. For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling directional audio selection functions according to various particular implementations. It is understood that portions of the control circuit 30 (e.g., instructions) could also be stored in a remote location or in a distributed location, and could be fetched or otherwise obtained by the control circuit 30 (e.g., via any communications protocol described herein) for execution. The instructions may include instructions for controlling directional audio selection-based processes (i.e., the software modules include logic for processing inputs from a user and/or sensor system to manage audio streams), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include inner microphones 18 and/or outer microphones 24, sensors for detecting inertial conditions at the personal audio device and/or conditions of the environment proximate personal audio device 10 as described herein. The sensors may be on-board the personal audio device 10, or may be remote or otherwise wireless (or hard-wired) connected to the personal audio device 10. As described further herein, sensor system 36 can include a plurality of distinct sensor types for detecting inertial information, environmental information, or commands at the personal audio device 10. In particular implementations, sensor system 36 can enable detection of user movement, including movement of a user's head or other body part(s). In particular, portions of sensor system 36 may incorporate one or more movement sensors, such as accelerometers, gyroscopes and/or magnetometers. In some particular implementations, sensor system 36 can include a single IMU having three-dimensional (3D) accelerometers, gyroscopes and a magnetometer.

Advances in MEMS (microelectromechanical systems) technologies have enabled the manufacture of relatively low cost multi-axis accelerometers, gyroscopes, and magnetometers of small size and having relatively low power consumption using processes based on those employed in the microelectronics industry. Developments in this field have also resulted in the creation of relatively low cost MEMS devices that combine a multi-axis accelerometer, gyroscope, and/or magnetometer (sometimes referred to as an IMU or inertial measurement unit). In employing accelerometer(s), gyroscope(s) and/or magnetometer(s) in sensor system 36 to detect movement and/or orientation, and in employing these observations concerning movement of the human body, it is possible both to detect movement imparted to the personal audio device 10 and to distinguish instances of that movement being caused by a user of that personal audio device 10 from instances of that movement being caused by some other influence. For example, where a user is traveling in a vehicle, it is possible to distinguish between movements made by the user from movement made by the vehicle. In this way, it is possible to detect that a personal audio device 10 is not in position on a user's head or body, even if that personal audio device 10 has been placed on a seat or elsewhere in moving vehicle, despite the fact that a moving vehicle will subject the personal audio device 10 to changes in acceleration and/or orientation as the vehicle moves.

In various implementations, the sensor system 36 can be located at the personal audio device 10, e.g., where an IMU is physically housed in the personal audio device 10. In some examples, the sensor system 36 (e.g., including the IMU) is configured to detect a position, or a change in position, of the personal audio device 10. This inertial information can be used to control various functions described herein. For example, the inertial information can be used to trigger a command function, such as activating an operating mode of the personal audio device 10 (e.g., a spatial audio mode), modify playback of an audio sample in the spatial audio mode, or initiate playback of audio content associated with one or more samples.

The sensor system 36 can also include one or more interface(s) for receiving commands at the personal audio device 10. For example, sensor system 36 can include an interface permitting a user to initiate functions of the personal audio device 10. In a particular example implementation, the sensor system 36 can include, or be coupled with, a capacitive touch interface for receiving tactile commands on the personal audio device 10.

In other implementations, as illustrated in the phantom depiction in FIG. 1, one or more portions of the sensor system 36 can be located at another device capable of indicating inertial information about the user of the personal audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the personal audio device 10, such as where personal audio device 10 includes headphones and an IMU is located in a pair of glasses, a watch or other wearable electronic device.

According to various implementations, the audio playback devices (which may be, for example, personal audio device 10 of FIG. 1) described herein can be configured to operate in a spatial audio mode according to one or more factors. These particular implementations can allow a user to select between a plurality of choices conveyed to a user via audio, for example a plurality of audio playback sources, using directional commands detectable at the personal audio device 10, or another device connected with the personal audio device 10. In some cases, these implementations allow a user to sample a plurality of audio content sources and select audio content source(s) for playback using inertial commands. These inertial commands can be executed at the personal audio device 10 (or another connected device), and can permit control of audio playback without the need to interface with an audio gateway device (e.g., a mobile phone, personal computer (PC), e.g., tablet), or provide voice commands to a control device. These implementations can enhance the user experience in comparison to conventional audio systems, e.g., audio systems requiring commands at an audio gateway interface or voice commands at a control device.

Figure 2:
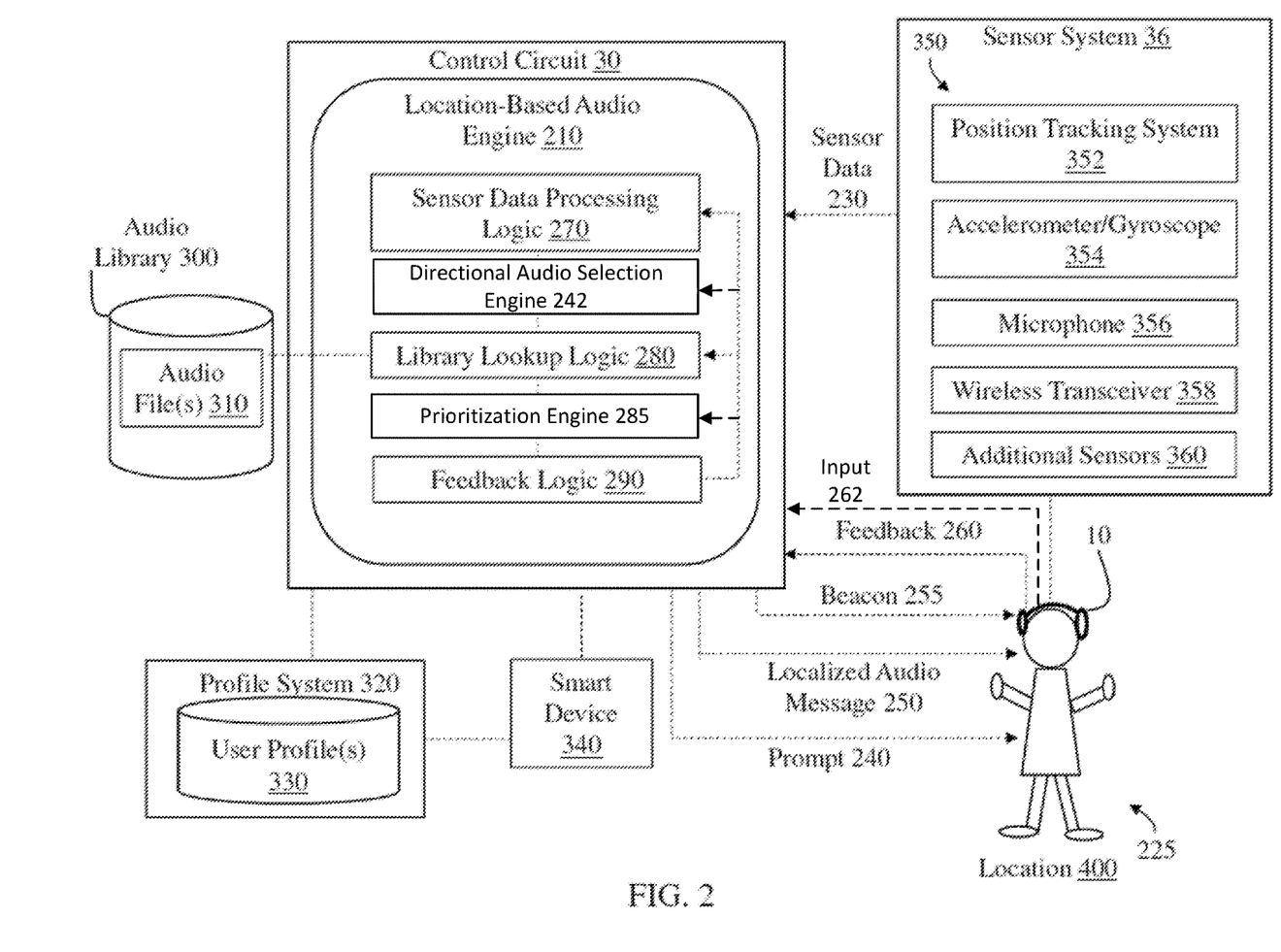
FIG. 2 shows a schematic depiction of data flows in a system including the personal audio device of FIG. 1, connected with an audio gateway device, according to various implementations.

As described with respect to FIG. 1, control circuit 30 can execute (and in some cases store) instructions for controlling directional audio selection in personal audio device 10 and/or other audio playback devices in a network of such devices. As shown in FIG. 2, control circuit 30 can include a location-based audio engine 210 configured to implement modifications in audio outputs at the transducer (e.g., speaker) 28 (FIG. 1) in response to a change in location-based or other conditions. In various particular embodiments, location-based audio engine 210 is configured to receive data about an environmental condition from sensor system 36, and modify the audio output at transducer(s) 28 in response to a change in the environmental condition. In particular implementations, the audio output includes a localized audio message provided at a specific geographic location, or proximate a specific geographic location, which is configured to vary with the change(s) in location and/or environmental condition. In certain cases, the localized audio message can only be provided to the user at or proximate the geographic location, providing an immersive experience at that location.

According to various implementations, control circuit 30 includes the location based audio engine 210, or otherwise accesses program code for executing processes performed by location-based audio engine 210 (e.g., via network interface 34). Location based audio engine 210 can include logic for processing sensor data 230 (e.g., receiving data indicating proximity of personal audio device 10 to a geographic location) from sensor system 36, and providing a prompt 240 to the user 225 to initiate playback of a localized audio message 250 to the user 225 at the personal audio device 10. In various implementations, in response to actuation (e.g., feedback 260) of the prompt 240 by the user 225, the location-based audio engine 210 initiates playback of the localized audio message 250 at the personal audio device 10. In additional implementations, location-based audio engine 210 can provide a beacon 255 to user 225 to indicate a direction of a localized audio message 250 based upon the sensor data 230. In some cases, this logic can include sensor data processing logic 270, library lookup logic 280 and feedback logic 290.

Location-based audio engine 210 can be coupled (e.g., wirelessly and/or via hardwired connections in personal audio device 10) with an audio library 300, which can include audio files 310 for playback (e.g., streaming) at personal audio device 10 and/or a profile system 320 including user profiles 330 about one or more user(s) 225. Audio library 300 can include any library associated with digital audio sources accessible via network interface 34 (FIG. 1) described herein, including locally stored, remotely stored or Internet-based audio libraries. Audio files 310 can additionally include audio pins or caches created by other users, and made accessible according to various functions described herein. User profiles 330 may be user-specific, community-specific, device-specific, location-specific or otherwise associated with a particular entity such as user 225. User profiles 330 can include user-defined playlists of digital music files, audio messages stored by the user 225 or another user, or other audio files available from network audio sources coupled with network interface 34 (FIG. 1), such as network attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the audio personal audio device 10 over a wide area network such as the Internet. In some cases, profile system 320 is located in a local server or a cloud-based server, similar to any such server described herein. User profile 330 may include information about frequently played audio files associated with user 225 or other similar users (e.g., those with common audio file listening histories, demographic traits or Internet browsing histories), "liked" or otherwise favored audio files associated with user 225 or other similar users, frequency with which particular audio files are changed by user 225 or other similar users, etc.

Profile system 320 can be associated with any community of users, e.g., a social network, subscription-based music service (such as a service providing audio library 300), and may include audio preferences, histories, etc. for user 225 as well as a plurality of other users. In particular implementations, profile system 320 can include user-specific preferences (as profiles 330) for audio messages and/or related notifications (e.g., beacons or beckoning messages). Profiles 330 can be customized according to particular user preferences, or can be shared by users with common attributes.

Location-based audio engine 210 can also be coupled with a smart device 340 that has access to a user profile (e.g., profile 330) or biometric information about user 225. It is understood that smart device 340 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 340 can include a conventional user interface for permitting interaction with user 225, and can include one or more network interfaces for interacting with control circuit 30 and other components in personal audio device 10 (FIG. 1). In some example implementations, smart device 340 can be utilized for: connecting personal audio device 10 to a Wi-Fi network; creating a system account for the user 225; setting up music and/or location-based audio services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases smart device 340 may also be used for: music services setup; browsing of content; setting preset assignments on the audio playback devices; transport control of the audio playback devices; and selecting personal audio devices 10 (or other playback devices) for content playback. Smart device 340 can further include embedded sensors for measuring biometric information about user 225, e.g., travel, sleep or exercise patterns; body temperature; heart rate; or pace of gait (e.g., via accelerometer(s).

As shown in FIG. 2, sensor system 36 can include one or more of the following sensors 350: a position tracking system 352; an accelerometer/gyroscope 354; a microphone (e.g., including one or more microphones) 356 (which may include or work in concert with microphones 18 and/or 24); and a wireless transceiver 358. These sensors are merely examples of sensor types that may be employed according to various implementations. It is further understood that sensor system 36 can deploy these sensors in distinct locations and distinct sub-components in order to detect particular environmental information relevant to user 225.

The position tracking system 352 can include one or more location-based detection systems such as a global positioning system (GPS) location system, a Wi-Fi location system, an infra-red (IR) location system, a Bluetooth beacon system, etc. In various additional implementations, the position tracking system 352 can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. Position tracking system 352 can be configured to detect changes in the physical location of the personal audio device 10 and/or user 225 (where user 225 is separated from personal audio device 10) and provide updated sensor data 230 to the location-based audio engine 210 in order to indicate a change in the location of user 225. Position tracking system 352 can also be configured to detect the orientation of the user 225, e.g., a direction of the user's head, or a change in the user's orientation such as a turning of the torso or an about-face movement. In some example implementations, this position tracking system 352 can detect that user 225 has moved proximate a location 400 with a localized audio message 250, or that the user 225 is looking in the direction of a location 400 with a localized audio message 250. In particular example implementations, the position tracking system 352 can utilize one or more location systems and/or orientation systems to determine the location and/or orientation of the user 225, e.g., relying upon a GPS location system for general location information and an IR location system for more precise location information, while utilizing a head or body-tracking system to detect a direction of the user's viewpoint. In any case, position tracking system 352 can provide sensor data 230 to the location-based audio engine 210 about the position (e.g., location and/or orientation) of the user 225.

The accelerometer/gyroscope 354 can include distinct accelerometer components and gyroscope components, or could be collectively housed in a single sensor component. This component may be used to sense gestures based on movement of the user's body (e.g., head, torso, limbs) while the user is wearing the personal audio device 10 or interacting with another device (e.g., smart device 340) connected with personal audio device 10. As with any sensor in sensor system 36, accelerometer/gyroscope 354 may be housed within personal audio device 10 or in another device connected to the personal audio device 10. In some example implementations, the accelerometer/gyroscope 354 can detect an acceleration of the user 225 and/or personal audio device 10 or a deceleration of the user 225 and/or personal audio device 10.

The microphone 356 (which can include one or more microphones, or a microphone array) can have similar functionality as the microphone(s) 18 and 24 shown and described with respect to FIG. 1, and may be housed within personal audio device 10 or in another device connected to the personal audio device 10. As noted herein, microphone 356 may include or otherwise utilize microphones 18 and 24 to perform functions described herein. Microphone 356 can be positioned to receive ambient audio signals (e.g., audio signals proximate personal audio device 10). In some cases, these ambient audio signals include speech/voice input from user 225 to enable voice control functionality. In some other example implementations, the microphone 356 can detect the voice of user 225 and/or of other users proximate to or interacting with user 225. In particular implementations, location-based audio engine 210 is configured to analyze one or more voice commands from user 225 (via microphone 356), and modify the localized audio message 250 based upon that command. In some cases, the microphone 356 can permit the user 225 to record a localized audio message 250 for later playback at the location 400a, 400b, 400c, etc., by the user 225 or another user. In various particular implementations, the location-based audio engine 210 can permit the user 225 to record a localized audio message 250 to either include or exclude ambient sound (e.g., controlling ANR during recording), based upon the user preferences. In some examples, user 225 can provide a voice command to the location-based audio engine 210 via the microphone 356, e.g., to control playback of the localized audio message 250. In these cases, sensor data processing logic 270 can include logic for analyzing voice commands, including, e.g., natural language processing (NLP) logic or other similar logic.

Returning to sensor system 36, wireless transceiver 358 (comprising a transmitter and a receiver) can include, for example, a Bluetooth (BT) or Bluetooth Low Energy (BTLE) transceiver or other conventional transceiver device, and may be configured to communicate with other transceiver devices in distinct locations. In some example implementations, wireless transceiver 358 can be configured to detect an audio message (e.g., an audio message 250 such as an audio cache or pin) proximate personal audio device 10, e.g., in a local network at a geographic location or in a cloud storage system connected with the geographic location 400. For example, another user, a business establishment, government entity, tour group, etc. could leave an audio message 250 (e.g., a song; a pre-recorded message; an audio signature from: the user, another user, or an information source; an advertisement; or a notification) at particular geographic (or virtual) locations, and wireless transceiver 358 can be configured to detect this cache and prompt user 225 to initiate playback of the audio message.

As noted herein, in various implementations, the localized audio message 250 can include a pre-recorded message, a song, or an advertisement. However, in other implementations, the localized audio message can include an audio signature such as a sound, tone, line of music or a catch phrase associated with the location at which the audio message 250 is placed and/or the entity (e.g., user, information source, business) leaving the audio message 250. In some cases, the localized audio message 250 can include a signature akin to an "audio emoji", which identifies that localized audio message 250, e.g., as an introduction and/or closing to the message. In these examples, an entity could have a signature tone or series of tones indicating the identity of that entity, which can be played before and/or after the content of the localized audio message 250. These audio signatures can be provided to the user 225 (e.g., by location-based audio engine 210) generating the localized audio message 250 as standard options, or could be customizable for each user 225. In some additional cases, the localized audio message 250 can be editable by the user 225 generating that message. For example, the user 225 generating a localized audio message 250 can be provided with options to apply audio filters and/or other effects such as noise suppression and/or compression to edit the localized message 250 prior to making that localized message 250 available (or, "publishing") to other user(s) 225 via the location-based audio engine 210. Additionally, the localized audio message 250 can enable playback control (e.g., via location-based audio engine 210), permitting the listening user 225 to control audio playback characteristics such as rewind, fast-forward, skip, accelerated playback (e.g., double-time), etc.

In particular example implementations, the user 225 can "drop" a localized audio message 250 such as a pin when that user 225 is physically present at a particular geographic location. For example, the user 225 can share a live audio recording, sampled using microphone 356 or another microphone to provide a snapshot of the audio at that location. This localized audio message 250 can then be associated (linked) with the geographic location and made available to the user 225 or other users at a given time (or for a particular duration) when those users are also proximate to the geographic location. In other example, the localized audio message 250 can be generated from a remote location, that is, a location distinct from the particular geographic location associated with the localized audio message 250. As described herein, access to localized audio message(s) 250 and creation of such message(s) 250 can be tailored to various user and group preferences. However, according to various implementations, the localized audio message 250 is only accessible to a user 225 that is proximate the geographic location associated with that message 250, e.g., a user 225 physically located within the proximity of the geographic location.

It is understood that any number of additional sensors 360 could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

Figure 3:
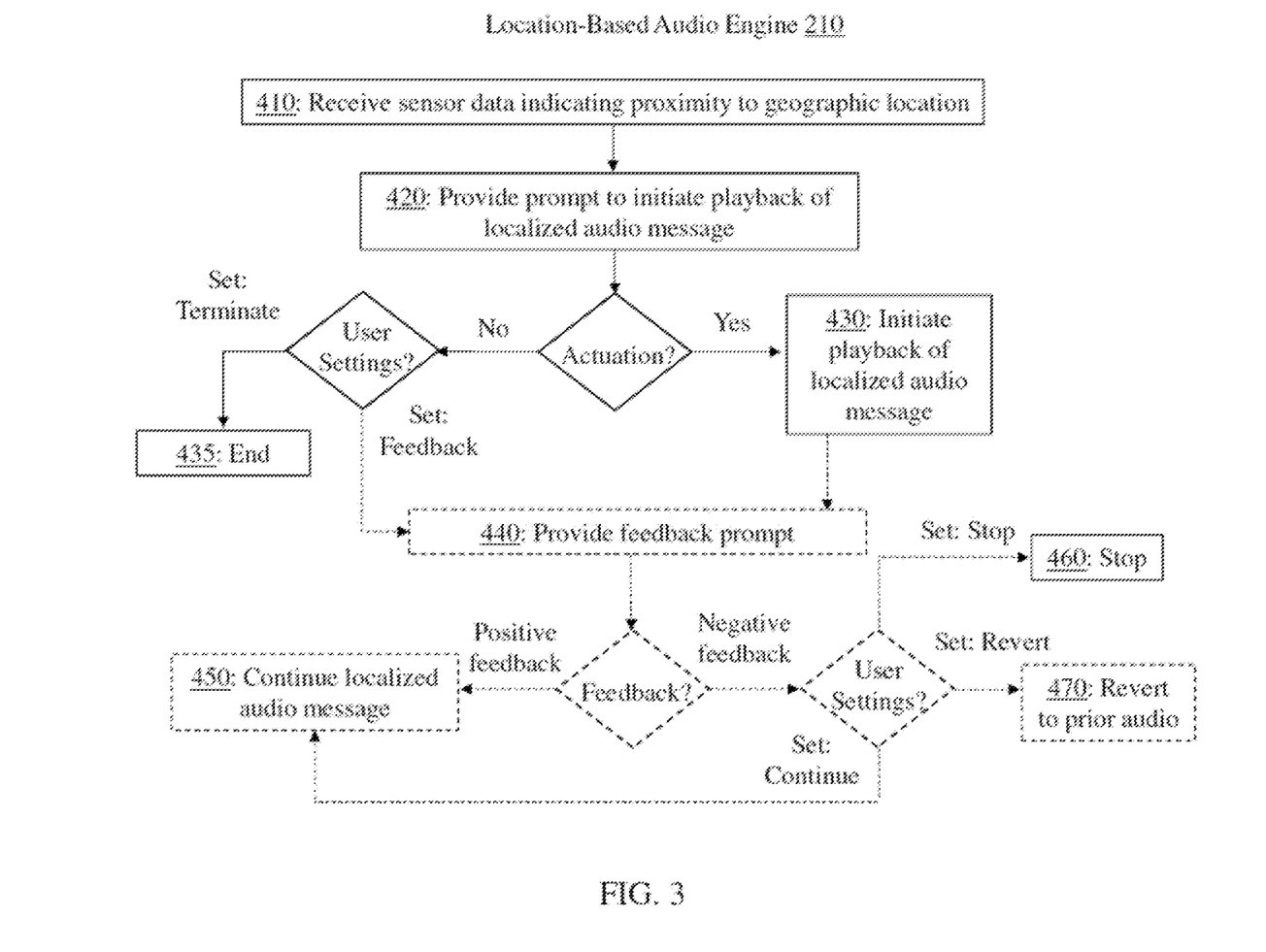
FIG. 3 shows a schematic depiction of an environment including a user interacting with the audio device of FIGS. 1 and 2, according to various implementations.

As noted herein, location-based audio engine 210 can include logic for performing audio control functions according to various implementations. FIG. 3 shows a flow diagram illustrating processes in location-based audio control performed by location-based audio engine 210 and its associated logic. In FIG. 3, location-based audio engine 210 receives sensor data 230 from sensor system 36 (410) indicating that the personalized audio device (or simply, audio device) 10 is proximate a geographic location associated with a localized audio message 250. Based upon that sensor data 230, location-based audio engine 210 provides a prompt 240 to initiate playback of the localized audio message 250 at audio device 10 (420). The location based audio engine 210 can initiate playback of the localized audio message 250 in response to actuation of the prompt 240 by the user 225 (430). If the user 225 does not actuate the prompt 240, in some implementations based upon user settings (Set: Terminate), the location-based audio engine 210 can terminate the prompt (end), e.g., after a timeout period or when user 225 leaves the geographic location (435). In other cases, user settings are set (Set: Feedback) to provide a feedback prompt (e.g., in a similar manner as prompt 240 to initiate playback, or via another prompt approach described herein) to elicit feedback 260 about the localized audio message 250, method of notification, or general notification settings (440, illustrated as optional in dashed lines). Additionally, this feedback 260 can be elicited during or after playback of the localized audio message 250, even in the case that the user 225 actuates the prompt 240 and initiates playback of that message 250. The feedback from user 225 can be treated according to user settings or default settings for the location-based audio engine 210. For example, in some cases, the location-based audio engine 210 can continue playing the localized audio message 250 in response to positive feedback from the feedback prompt (450). In these cases, where the user 225 provides negative feedback relative to the feedback prompt, the location-based audio engine 210 can check user settings (e.g., in user profile(s) 330) and take corresponding action. For example, user settings can indicate that negative feedback should continue play of the localized audio message 250 (process 450, FIG. 3). In other instances, user settings can indicate that negative feedback should trigger a halt (stop) of the localized audio message 250, or revert back to a prior audio output (e.g., audio output that was interrupted by localized audio message) (process 460, FIG. 3).

As noted herein, sensor data 230 can include data about one or more location-based or environmental conditions detected by sensor system 36, and may include data about a plurality of environmental conditions. For example, sensor data 230 can include data about a position and/or orientation of the personal audio device 10 (e.g., from position tracking system 352), data about the direction the person audio device 10 is facing, data about an acceleration of personal audio device 10 (e.g., from accelerometer/gyroscope 354), data about the ambient audio conditions proximate personal audio device 10 (e.g., from microphone 356) or data about nearby audio, video or other data caches (e.g., from wireless transceiver 358).

Returning to FIG. 2, in various implementations, sensor data processing logic 270 is configured to process the sensor data 230 and provide a weighted localized representation to library lookup logic 280 to enable fetching a type of audio file 310 for providing in the localized audio message 250. That is, sensor data processing logic 270 can include weightings or factoring for one or more of user preferences (e.g., user profile(s) 330), sensor data about past events (e.g., position and/or acceleration information about personal audio device 10 over given periods), audio files (e.g., audio samples of user's voices, or audio signatures such as ambient audio signatures, as sampled by microphone 356), and other readily available data (e.g., a demographic profile of a plurality of users with at least one common attribute with the user 225 or a categorical popularity of an audio file 310). The weighted localized representation may indicate a general characteristic of the location 400a, 400b, 400c, etc., as a combination of factors from sensor data 230, profile(s) 330 and/or information from smart device 340.

After processing the sensor data 230 with sensor data processing logic 270, library lookup logic 280 can search audio library 300 for audio files 310 using the weighted localized representation from sensor data processing logic 270. Library lookup logic 280 may include a relational database with relationships between the weighted localized representation and audio files 310. As noted herein, audio library 300 can be locally stored at personal audio system 10, smart device 340, (FIG. 1) and/or stored at one or more remote or cloud-based servers. Library lookup logic 280 can be continually updated based upon changes in audio library 300 in order to provide accurate, timely associations between the weighted localized representation from sensor data processing logic 270 and audio files 310. In various implementations, as noted herein, the localized audio message 250 is selected based upon a proximity of the personal audio device 10 to a particular geographic location. The library lookup logic 280 can utilize the weighted localized representation to determine which, if any, localized audio message(s) 250 should be provided to the user 225 (e.g., via prompt 240 and related processes) according to the user profile 330 and/or proximity to geographic locations. For example, the library lookup logic 280 can be configured to select a localized audio message 250 from the audio files 310 when the user 225 is moving between multiple locations, as well as when the user 225 approaches a location, leaves a location, or turns toward or away from a location. Additionally, as discussed herein, library lookup logic 280 can be configured to select a beacon 255 to direct the user 225 to one or more localized audio message(s) 250 based upon the weighted localized representation.

In some example implementations, location-based audio engine 210 (e.g., using sensor data processing logic 270 and/or library lookup logic 280) is configured to perform one or more of the following logic processes using sensor data 230 and/or other data accessible via profile system 320, smart device 340, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, location-based audio engine 210 is configured to work in concert with sensor system 36 to continually monitor changes in one or more environmental conditions. In some cases, sensor system 36 may be set in an active mode, such as where position tracking system 352 pings nearby Wi-Fi networks to triangulate location of the personal audio device 10, or microphone 356 (or microphones 18 and/or 24) remains in a "listen" mode for particular ambient sounds. In other implementations, sensor system 36 and location-based audio engine 210 can be configured in a passive mode, such as where wireless transceiver 358 detects signals transmitted from nearby transceiver devices or network devices. In still other implementations, distinct sensors in the sensor system 36 can be set in distinct modes for detecting changes in environmental conditions and transmitting updated sensor data 230 to location-based audio engine 210. For example, some sensors in sensor system 36 can remain in an active mode while audio device 10 is active (e.g., powered on), while other sensors may remain in a passive mode for triggering by an event.

The weighted localized representation calculated based upon the sensor data 230 can be used to select the appropriate localized audio message 250 for playback at the audio device 10. In various implementations, the geographic location 400 is defined according to at least one of a geo-fence, a local area network, a Bluetooth network, a cellular network, or a global positioning system (GPS), though other techniques may be used. According to particular implementations, the range of detection or actuation of the localized audio message 250, is defined at the time of generation of that localized audio message 250. In particular cases, the range is defined as a radius surrounding the location 400 of the localized audio message 250. However, the range can be defined according to any variety of shapes and/or sizes. For example, the range can take the form of a radius such as a circle or other polygon shape (e.g., square, rectangle, triangle) surrounding the location 400. In some cases, the user 225 can define the range (or, radius) of the localized audio message 250 at the time of generation. In certain implementations, the radius can be centered on the location 400 of the localized audio message 250 or a point of interest. However, in other cases, the center of the radius around location 400 can be shifted by the generating user 225. Additionally, localized audio message(s) 250 can be placed at locations which are distinct from the subject of the localized audio message 250. In one example, a business located on the corner of a busy, urban intersection may prefer that its localized audio message 250 be located across the street from the business in order to capture more visitors and/or interest. In other cases, the radius can be shifted to account for a higher density of potential users 225, e.g., where a location 400 is proximate a natural barrier such as a body of water or major roadway, and users 225 are likely to be located on one side of that barrier. In various implementations, the location-based audio engine 210 can generate a weighted localized representation based upon a proximity to one or more of these indicators of geographic location. In some cases, the location-based audio engine 210 utilizes user-specific or environment-specific criteria to define "proximity" to a geographic location. For example, sensor data 230 can indicate that a user 225 is located within a one-block radius of a localized audio message 250, but that additional localized audio messages 250 are also within one block of the user 225. The location-based audio engine 210 could rely more heavily upon data from sensors having a higher degree of certainty (e.g., via weighting) to determine a closest localized audio message 250.

In some implementations, the location-based audio engine 210 can include a radius setting for determining access to prompts 240 and associated localized audio messages 250. That is, the accessible proximity to the geographic location 400 (e.g., range in which a prompt 240 will be sent, and a localized audio message 250 can be received) can be adjustable according to various implementations. In some particular aspects, the accessible proximity to the geographic location 400 is adjustable based upon a density of a geographic region, such as the population density of a region or the localized audio message density of a region. In other aspects, the accessible proximity to the geographic location 400 is adjustable based upon user profile data (in user profile(s) 330) of the user 225 or the provider of the localized audio message 250. In these examples, the user 225 could define an accessible proximity in order to avoid over-stimulation from prompts 240 in a region with a high density of localized audio messages 250, or to avoid a message "desert", where localized audio messages 250 are separated by significant distances. Additionally, the provider of the localized audio message 250 can define the proximity to the geographic location. This scenario could be useful for an advertiser or proprietor looking to draw users 225 toward a particular location, such as with localized audio message(s) 250 about product sales, time-sensitive offers, or events. In other implementations, default settings or common settings can be used to define the proximity to a geographic location of the localized audio message 250. In still other implementations, a provider of the localized audio message(s) 250 can adjust the accessible radius of those messages 250, and in particular cases, could provide payment or other crediting to expand or contract that radius.

In some implementations, the location-based audio engine 210 includes a directional audio selection engine 242 that is configured to select one or more audio files 310 for delivery to the device 10 based on a direction of gaze of the user 225. In some implementations, the audio files 310 selected by the directional audio selection engine 242 can be settings-specific, location-specific or otherwise tailored to particular user experiences. In some cases, directional audio selection engine 242 selects, for presentation to the user, one or more audio files 310 that are related to a particular location, e.g., when the user approaches that location. In example implementations, when a user is at an intersection, directional audio selection engine 242 can present audio prompts, beacons or other indicators to the user based upon the direction in which the user is facing (detected according to various implementations described herein). For example, when the user at an intersection activates the spatial audio mode (or has already activated the spatial audio mode or otherwise triggers settings to activate spatial audio mode), looking left can provide an audio sample (e.g., an audio prompt or audio beacon) indicating areas of interest in that direction. Looking right can trigger directional audio selection engine 242 to provide an audio sample indicating areas of interest in that direction. Additionally, looking straight ahead can trigger directional audio selection engine 242 to provide an audio sample indicating areas of interest in that direction. It these cases, an audio sample can provide introductory information about audio content 265 associated with one or more of the directions. In the intersection example: a) when looking right (during operation of the spatial audio mode), directional audio selection engine 242 can provide an audio sample such as: "Fenway Park is 0.5 miles from your current location in this direction; nod your head to hear highlights from last night's game"; b) when looking left (during operation of the spatial audio mode), directional audio selection engine 242 can provide an audio sample such as: "Boston Public Garden is 0.4 miles from your current location in this direction; tap your audio device to hear fun facts about this historic public gathering place"; and/or c) when looking straight ahead (during operation of the spatial audio mode), directional audio selection engine 242 can provide an audio sample such as: "You are two blocks from Newbury Street; walk forward to hear a listing of top-rated restaurants for lunch." It is understood that this example is merely illustrative of the various array layouts and audio sample types that can be utilized by directional audio selection engine 240 in spatial audio mode.

In particular implementations, as noted herein, audio content or audio files 310 can include any audibly presentable material that can be provided to the user after selection in the spatial audio mode. As described herein, audio files 310 can include one or more associated audio samples, which may include a portion (or all) of the corresponding audibly presentable material. That is, in certain cases, the term "audio sample" can refer to any audibly presented material associated with an audio pin, and can include a portion of the audio pin, or other audibly presented material altogether, which indicates the source of the corresponding audio pin. This sample need not be a part of the underlying audio content, and may merely serve to identify the audio content and/or its source. In some example implementations, when the user activates the spatial audio mode, directional audio selection engine 242 provides the user with audio samples in an array of spatially delineated zones. The user can select between these samples in the array to actuate additional functions of the directional audio selection engine 242, e.g., to initiate playback of the source of audio content associated with the selected audio sample. Samples (and associated content) can include music choices, navigation/direction choices, news source choices, audio messages, general information about a location, safety alerts, location-specific audio pins, audio beacons, etc. Additional description of audio pins, location-specific messages, audio beacons and related content can be found in U.S. Provisional Patent Application No. 62/626,967, which is hereby incorporated by reference in its entirety. Additional description of the directional audio selection engine can be found in U.S. application Ser. No. 15/908,183, titled "Directional Audio Selection," and filed on Feb. 28, 2018, which is incorporated herein by reference in its entirety.

In some implementations, for a particular geographic location, multiple audio pins/caches of audio information may be determined as relevant, and therefore available for delivery to an acoustic device. In such cases, the multiple audio pins may be filtered/prioritized such that an audio pin may be selected for delivery over the others at a given time. This can be done, for example, by a prioritization engine 285 disposed within the control circuit 30. While the example in FIG. 2 shows the prioritization engine 285 disposed as a part of the location based audio engine 210, the prioritization engine 285 may also be disposed as a standalone module within the control circuit 30. The prioritization engine 285 can include one or more processing devices that are configured to filter/prioritize multiple audio pins/prompts/audio samples or other location-based audio content available for delivery to a user device 10 at a given location such that a particular audio file is delivered to the device at a given time. In some implementations, the prioritization engine 285 can be implemented as a combination of software and hardware components. In some implementations, the prioritization engine can be 285 can include computer-readable instructions encoded on a non-transitory storage medium, the instructions being executable by one or more processing devices to provide one or more functionalities described herein.

In some implementations, the prioritization engine 285 can be configured to filter available audio content based on user-preferences indicated, for example, via the feedback 260 and/or user-input 262. For example, if a user-input 262 specifies a particular type of information (e.g., "I am looking for coffee," "show me bookstores," or "seafood restaurants"), audio content pertaining to such information may be prioritized over other types of audio content. In some implementations, if the user-feedback 260 indicates a preference or dislike towards a particular type of audio content, corresponding types of audio content may be prioritized or deprioritized, respectively. For example, if the feedback 260 indicates that the user prefers Asian cuisine over Mexican, the prioritization engine audio content providing information about a Chinese restaurant may be delivered preferentially over audio content providing information about a Mexican joint. In some implementations, the user's preferences may be determined/predicted by analyzing user-behavior. For example, the prioritization engine 285 (or another portion of the control circuit 30) can determine, based on audio detected by one or more microphones of the device 10, that the user has mentioned the word "coffee" multiple times within a few minutes. Responsive to such a determination, the prioritization engine 285 can be configured to select/prioritize audio pins pertaining to coffee shops in the vicinity of the user.

In some implementations, the prioritization engine 285 can be configured to prioritize one audio pin over another based on the geo-location of the user as well as effective radii of audio pins in the vicinity of the user. As a user moves into a new location, new audio pins may become available, and such new audio pins may be prioritized over audio pins corresponding to a relatively more distant location. As described above, in some cases, the prioritization engine 285 can be configured to select a "teaser" audio sample to draw a user towards a specific audio pin location. In some implementations, audio pins may be filtered/prioritized based on the effective radius associated with the pins. The effective "radius" of a pin (e.g., the distance from which a user would need to be for that pin to become active) may be different for different audio pins based on various factors. For example, the radius of a pin may be defined by the content creator/generator. In some cases, the ability of the content creator/generator to define a larger radius for a pin may be tied to one or more attributes associated with the creator, including, for example, the number of followers of the creator, popularity of the creator's existing pins, etc. For example, a popular content creator (e.g., as defined by the number of followers) may be allowed to define a larger radius for generated pins. In another example, positively reviewed or highly liked pins may be allowed to have a larger radius. In some implementations, the radius of generated pins may be tied to financial accounts. For example, commercial entities may be allowed to increase the effective radius of their pins based on payments. In some cases, exclusivity of a pin may be represented via a small radius, such that the pin is triggered only within a small area.

In some implementations, the prioritization engine 285 can be configured to filter/prioritize audio pins based on user-preferences. In some cases, the prioritization engine 285 can be configured to adjust the radius of one or more audio pins, and select or prioritize the pins based on the adjusted radii of the pins. This way, the radius of the same pins can be different for different users. For example, if a first user indicates being a fan of the Boston Red Sox, the originally assigned radii of pins related to the Red Sox can be increased for that user. Similarly, if a second user indicates being a fan of the Boston Bruins, the pins related to the Bruins can be configured have increased radii for that particular user.

User preferences may be specified in various ways. For example, user-preferences may specify broad categories such as "revolutionary war history," or "Italian food," or something particular such as "Boston Red Sox." In some implementations, a user may specify preferences for receiving audio pins generated by a particular content generator. For example, user-preferences corresponding to the particular user can specify that the user is interested in a particular retail chain or a particular singer, and the prioritization engine 285 can be configured to prioritize content from such content providers. In some implementations, a user could "follow" or subscribe to the content generated by a particular content generator, and the prioritization engine 285 can be configured to alert the user to the availability of content from the particular content generator if the user enters a geographic area where such content is available. For example, if the user subscribes to content generated by a friend, the prioritization engine 285 can be configured to check for audio pins (e.g., reviews) left by the friend whenever the user enters a new geographical location (e.g., a restaurant). In some implementations, a user could create one or more channels, streams, or feeds, and/or specify one or more favorite interests, and the prioritization engine 285 can be configured to select, filter or prioritize audio content accordingly. In some implementations, the prioritization engine 285 can be configured to select/prioritize content based on whether the content provider or the user participates in a subscription plan. For example, the content from a subscribing content generator may be prioritized over non-subscribing content generators.

In some implementations, the prioritization engine 285 can be configured to select/prioritize audio content that form a part of a sequence. For example, a user could specify an interest in sequential audio pins that constitute, for example, a scavenger hunt, an expedition, or a story, and the prioritization engine 285 can be configured to prioritize audio pins from such a sequence, particularly if an audio pin from such a sequence has already been delivered to the user. In some implementations, a content generating entity may use such a sequence of audio pins to promote/advertise a new product. For example, a particular chain of coffee shops may have a new drink coming out at particular stores, and they may promote the drink by leaving a trail of audio pins for users to uncover access to the new drink. In some implementations, the prioritization engine 285 can be configured to alert a user to the availability of such sequences in a geographical area, if the user has indicated preference for such sequences.

In some implementations, the prioritization engine 285 can be configured to automatically present audio pins relating to user-preferred content. In some implementations, the prioritization engine 285 (or another portion of the control circuit 30) can be configured to present a user interface for navigating between the various favorites/channels/presets specified by the user. An example of such an interface is the virtual audio carousel user-interface, as described in U.S. application Ser. No. 15/908,183, titled "Directional Audio Selection," and filed on Feb. 28, 2018, the entire content of which is incorporated herein by reference. In some implementations, a user can use such an interface to browse through various options to discover if any related audio pins are available in a given geo-location. For example, standing in the North End in Boston, a user may cycle through his/her favorite audio pin feeds (e.g., Revolutionary War history, the Boston Red Sox, Italian food, Taylor Swift, and a predefined group of friends) and learn whether corresponding audio pins regarding these topics or crested by these people are available in the vicinity. In some implementations, the prioritization engine 285 can be configured to pre-filter the user's favorite audio pin feeds based on the location of the user. For example, based on a location of the user, the prioritization engine 285 can be configured to determine that there are no pins related to certain audio pin feeds, and thus filter such feeds out of a list presented through the user-interface.

In some implementations, the prioritization engine 285 can be configured to select/prioritize an audio pin based on a level of importance or popularity of the content. The level of importance or popularity can be determined, for example, based on ratings or feedback from other users. In some implementations, the number of times an audio pin has been shared, upvoted, and/or favorably rated can be used as a metric for the importance/popularity of the pin. In some implementations, the importance of a message for a particular user may be predicted based on, for example, using a machine learning process trained on prior messages the user has (and/or other users have) rated favorably, or messages in which the user has demonstrated interest. In some implementations, the importance of the content of an audio pin for a particular user may be determined based on the generator/provider of the content. For example, pins generated or created by family, friends or other acquaintances in a user's network (as determined, for example, from social media accounts associated with the user) may be prioritized by the prioritization engine 285, based on, for example, a determination/inference that the user would like to receive content from such people. In some implementations, the prioritization engine 285 can be configured to prioritize content based on user-preferences pertaining to generators/providers of content. For example, a user may specify the users whose contents are to be prioritized. The user-preferences may identify individuals (e.g., spouse, children, parents, and certain friends) or groups (e.g., social network contacts) for the prioritization engine 285 to select/prioritize content accordingly. In some implementations, the prioritization engine 285 can be configured to prioritize an audio pin based on friends, family or other people (e.g., as specified via user-preferences) sharing the audio pin, suggesting the audio pin, or liking the audio pin.

In some implementations, the prioritization engine 285 (or another portion of the control circuit 30) can be configured such that audio pins are delivered to the device 10 at a frequency in accordance with corresponding user-preferences. For example, a user may specify a limit on the number of audio pins that may be delivered (e.g., no more than one audio pin per five minutes). In some implementations, a user may place the audio device in a "mute mode" such that no audio pins are delivered when that mode is active. In some implementations, the mute mode may be activated automatically, for example, based on a determination that the user is in a location/situation where he/she wouldn't want audio pins delivered (e.g., while at work, while out for a run, etc.).

In-some implementations, the prioritization engine can be configured to prioritize/filter content based on a context, as determined, for example, using information collected by one or more sensors of the sensor system 36 and/or user-preferences. For example, if the prioritization engine (or another portion of the control circuit) makes a determination that a user is sightseeing in a new city for the day, the prioritization engine 285 can be configured to prioritize audio pins related to coffee/breakfast shops in the morning, pins related to fun travel facts/sightseeing after breakfast, and pins related to lunch in the middle of the day. In some implementations, the prioritization engine 285 can be configured to deliver such audio pins automatically, for example, based on the time of the day, geo-location of the user, and/or other sensor inputs. In some implementations, the prioritization engine 285 can be configured to deliver such information on demand, for example, upon activation of particular modes by the user. In some implementations, the user may activate a particular mode using a graphical user-interface on a connected smartphone, through a control (e.g., a button or other control) disposed on the device 10, or using a voice command such as "enter restaurant mode," "enter sightseeing mode," or "enter coffee mode," etc.

In some implementations, the prioritization engine 285 can be configured to prioritize/filter content based on a direction of gaze of a user. In such cases, the prioritization engine 285 may work cooperatively with the directional audio selection engine 242 in delivering audio content. Inputs from one or more sensors of the sensor system 36 may be used in determining the gaze direction of the user and/or the direction the user is facing. For example, a combination of accelerometers, gyroscopes, and magnetometers (e.g., a three-axis accelerometer, a three-axis gyroscope, and a three-axis magnetometer), possibly in addition with a position tracking system 352, may be used to determine the direction that a user is facing or looking. The accelerometers, gyroscopes, magnetometers, and possibly the position tracking system 352, may be disposed in the device 10, which may be a head-worn device such as a headphone or an eyeglass (an example of which is illustrated in US Design Application No. 29/639,191, filed on Mar. 5, 2018, the entire content of which is incorporated herein by reference). In one example, when a user is standing at an intersection in New York City, information from the position tracking system 352 can be used to track the location of the user, and information from a set of accelerometer, gyroscope, and magnetometer can be used to determine the direction of gaze of the user. The combination of the information can be used to deliver relevant audio content to the user. For example, if the user looks towards one particular direction from the intersection, one or more audio pins describing the points of interest along that direction may be delivered to the device 10 of the user. In another example, if the user looks down towards the ground, an audio pin containing map information about the area may be delivered (e.g., "you are standing at the intersection of street X and street y, to you right . . . " etc.), whereas looking up can cause delivery of weather information. In some implementations, upon determining that the user is looking towards a particular target for more than a threshold amount of time, one or more audio pins related to the target may be delivered. For example, upon determining that the user is looking towards a particular restaurant or shop, an audio pin related to the particular establishment (e.g., an advertisement, an information nugget, or other audio content) may be delivered to the device 10 of the user.

In some implementations, the prioritization engine 285 can be configured to take into account line of sight/visibility in determining which audio pins to filter/prioritize. For example, in addition to location and gaze direction information of the user, the prioritization engine 285 can be configured to determine what might be in the user's field of vision, considering, for example, the time of the day, weather, possible obstructions in the line of vision, etc. For example, a user in Paris may be determined to be looking at the Eiffel tower from a location that is a threshold distance away from the landmark. However, when closer to the Eiffel Tower, a gaze along the same direction can mean that the user is looking at something else, because the line of sight to the Eiffel Tower is blocked by buildings or other structures. In some implementations, the line-of-sight determination can be based on, for example, map data corresponding to the location of the user, and/or information captured using a camera or other sensors mounted on the device 10. In some implementations, other contextual data, e.g., weather data related to fog, rain, time of the day, etc., may be used to make a determination regarding the field of vision of the user.

In some implementations, the prioritization engine 285 can be configured to filter/prioritize audio pins based on language. For example, a user may indicate, via user-preferences, that the user is interested in pins that are in English and/or some other language. In such cases, the prioritization engine 285 can be configured to filter out or deprioritize audio pins in other languages. In some implementations, the prioritization engine can be configured to filter/prioritize audio pins based on user behavior, as determined, for example, based on the user's location information and/or data on the user's prior interaction patterns with audio pins. For example, the prioritization engine 285 can be configured to prioritize/filter audio pins based on knowledge of where a user typically is at a time of day and/or what he/she is typically doing at that time of day. This can be done, for example, using a machine-learning process configured to learn a user's habits (e.g., by using application usage data, location data, and/or data on interaction with previously delivered audio pins as the training corpus) and accordingly deliver audio pins deemed as relevant to the user's location and/or activities throughout the day.

In some implementations, at least a portion of the training corpus (e.g., the application usage data) can be obtained from the user's smart phone (or another device that the user interacts with during the course of the day) and/or one or more applications installed on the smart phone. For example, a coffee shop app on a user's device can have information that every day, the user visits a particular store associated with the coffee shop and orders a chai latte. This information can be used by the prioritization engine 285 to select/prioritize an audio pin created by the coffee shop. For example, a dynamically generated audio pin can be delivered to the user at the appropriate time to help the user avoid a line/wait time at the store. The audio pin could account for the current wait time (e.g., 15 minutes), and include content such as "Looks like you are headed to our store to pick up your drink. Would you like us to have your chai latte ready for you in 15 minutes?" In some implementations, delivery of such content may be triggered automatically if the user subscribes to content from the particular coffee shop, or manually by activating a particular mode (e.g., a "coffee mode") for receiving audio pins. In some implementations, promotions or advertisements could be delivered to a user based on location information and/or knowledge of habits. For example, the prioritization engine 285 may prioritize/select pins from competing coffee shops when a user is determined to be looking for coffee.

In some implementations, the prioritization engine 285 can be configured to select/prioritize audio pins based on whether the audio pins are private or public. For example, some audio pins may be publicly available to any user who wishes to listen to them, whereas other content may be generated specifically for private use by a user or a group of user. In some implementations, a content creator (e.g., a friend of a user) may create a private review of a restaurant specifically for the particular user or a group of user that includes the particular user. In such cases the prioritization engine 285 can be configured to select/prioritize such content for the particular user or group of users but deprioritize/filter out for users not within the group.

In some implementations, the prioritization engine 285 can be configured to catalog or archive audio pins for later delivery based on one or more criteria. For example, the prioritization engine 285 can be configured to assign a score to candidate audio pins, and candidates having a score higher than a threshold, but not selected for immediate delivery, may be archived or cataloged for later delivery. In some implementations, the user may catalog or archive one or more pins (e.g., via an appropriate user-interface), which may be selected/prioritized by the prioritization engine 285 at a later time. In some implementations, the archived/cataloged audio pins may be buffered for a period of time and/or until the user clears the pins from the buffer.

Figure 4:
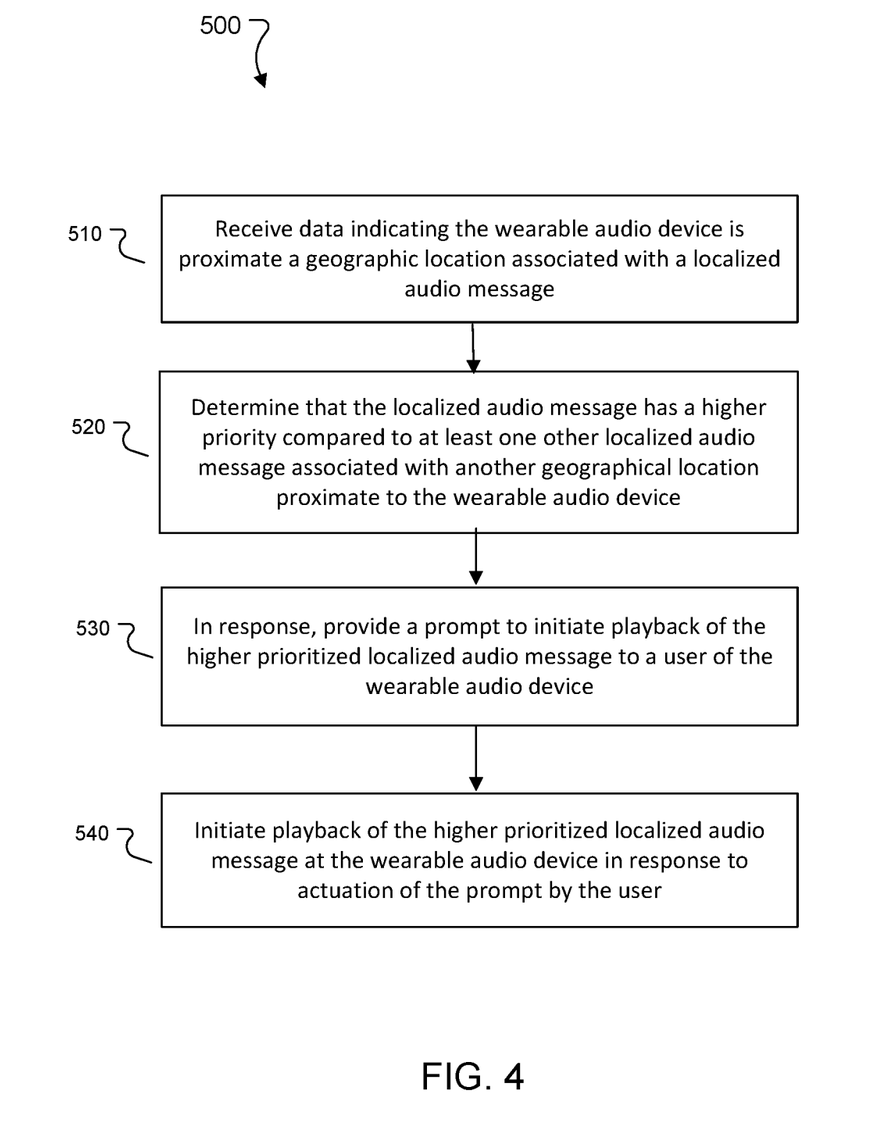
FIG. 4 is a flowchart of an example process for controlling a wearable audio device in accordance with technology described herein.

FIG. 4 is a flowchart of an example process 500 for controlling a wearable audio device in accordance with technology described herein. In some implementations, at least a portion of the process 500 may be executed by one or more processing devices disposed in the control circuit 30. Operations of the process 500 include receiving data indicating the wearable audio device is proximate a geographic location associated with a localized audio message (510). The wearable audio device can be substantially similar to the audio device 10 described above. The localized audio message can be substantially similar to the audio pins described above.

Operations of the process 500 can also include determining that that the localized audio message has a higher priority compared to at least one other localized audio message associated with another geographical location proximate to the wearable audio device (520). In some implementations, this may be done based upon one or more of: user preferences, geo-location of a user of the wearable audio device, look direction of the wearable audio device, or an effective operational radius. The operational radius may be defined by respect to the localized audio content, for example, by the creator of the content. In some implementations, the operational radius may also be defined by the user, and represent the area from where the user is interested in receiving localized audio content. In some implementations, determining the priority of the localized audio message is repeated based upon movement of the user of the wearable audio device.

In some implementations, determining the priority of the localized audio message can be based upon an interaction of the user with a user-interface provided by the wearable audio device. For example, if a user indicates through a user-interface that the user, is interested in a particular type of audio content, the localized audio message can be prioritized (or deprioritized) based on such input. In some implementations, the localized audio message can be prioritized based upon a predefined limit of localized audio messages to be received by the wearable audio device. In some implementations, and as described in detail above, the localized audio message can be prioritized based upon one or more of: a direction of gaze, a line of sight, and a language of the user of the wearable audio device. In some implementations, the localized audio message can be prioritized based upon one or more habits of the user of the wearable audio device as determined by a machine-learning process Operations of the process further include providing, responsive to determining that the localized audio message has the higher priority, a prompt to initiate playback of the localized audio message with the higher priority to a user of the wearable audio device (530). In some implementations, the prompt can be provided in the form of a visual alert (e.g., an LED light on the wearable audio device), a haptic feedback, or an audible message such as a chime. Operations of the process 500 also include initiating playback of the localized audio message with the higher priority at the wearable audio device in response to actuation of the prompt by the user (540). For example, if the user makes a gesture, or activates a control that is indicative of the user's intent to actuate the prompt, the audio message corresponding to the prompt can be played back to the user. In some implementations, a prompt may be bypassed, and the audio message may be automatically played back at the user's device.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling a wearable audio device configured to provide an audio output, the method comprising: receiving data indicating the wearable audio device is proximate a first entity associated with a first localized audio message; determining, based on data captured by one or more sensors mounted on the wearable audio device, a gaze direction of a user of the wearable audio device; determining, based at least on the gaze direction, that the first entity is visible to the user, wherein determining that the entity is visible to the user comprises determining that a line of sight between the user and the first entity along the gaze direction is unobstructed based on contextual information indicative of one or more parameters affecting a field of vision of the user, the contextual information including at least one of: information about the time of day and information about weather; responsive to determining that the entity is visible to the user, determining that the first localized audio message has a higher priority compared to at least one other second localized audio message associated with a second entity proximate to the wearable audio device, wherein the first localized audio message with the higher priority is determined based on data corresponding to a geo-location information of the wearable audio device; responsive to determining that the first localized audio message has the higher priority, providing a prompt to initiate playback of the first localized audio message with the higher priority to a user of the wearable audio device; and initiating playback of the first localized audio message with the higher priority at the wearable audio device in response to actuation of the prompt by the user.

2. The computer-implemented method of claim 1, wherein the first localized audio message is prioritized based upon user-preferences.

3. The computer-implemented method of claim 1, wherein the first localized audio message is prioritized based upon an effective operational radius.

4. The computer-implemented method of claim 1, wherein determining the priority of the first localized audio message is repeated based upon movement of the user of the wearable audio device.

5. The computer-implemented method of claim 1, wherein the first localized audio message is prioritized based upon an interaction of the user with a user interface provided by the wearable audio device.

6. The computer-implemented method of claim 1, wherein the first localized audio message is prioritized based upon a predefined limit of localized audio messages to be received by the wearable audio device.

7. The computer-implemented method of claim 1, wherein the first localized audio message is prioritized based upon a language spoken by the user of the wearable audio device.

8. The computer-implemented method of claim 1, wherein the first localized audio message is prioritized based upon one or more habits of the user of the wearable audio device as determined by a machine-learning process.

9. The computer-implemented method of claim 1, wherein the gaze direction is determined using one or more of an accelerometer, a gyroscope, and a magnetometer.

10. The method of claim 1, wherein determining that the line of sight between the user and the first entity along the gaze direction is unobstructed is based at least on information captured using one or more sensors of the wearable audio device.

11. A computing device comprising: memory; and one or more processing devices configured to: receive data indicating that a wearable audio device is proximate a first entity associated with a first localized audio message, determine, based on data captured by one or more sensors mounted on the wearable audio device, a gaze direction of a user of the wearable audio device, determine, based at least on the gaze direction, that the first entity is visible to the user, wherein determining that the entity is visible to the user comprises determining that a line of sight between the user and the first entity along the gaze direction is unobstructed based on contextual information indicative of one or more parameters affecting a field of vision of the user, the contextual information including at least one of: information about the time of day and information about weather, determine, responsive to determining that the entity is visible to the user, that the localized audio message has a higher priority compared to at least one other second localized audio message associated with a second entity proximate to the wearable audio device, wherein the localized audio message with the higher priority is determined based on data corresponding to a geo-location information of the wearable audio device, responsive to determining that the first localized audio message has the higher priority, provide a prompt to initiate playback of the first localized audio message with the higher priority to the user of the wearable audio device, and initiate playback of the first localized audio message with the higher priority at the wearable audio device in response to actuation of the prompt by the user.

12. The computing device of claim 11, wherein the first localized audio message is prioritized based upon user-preferences.

13. The computing device of claim 11, wherein the first localized audio message is prioritized based upon an effective operational radius.

14. The computing device of claim 11, wherein determining the priority of the first localized audio message is repeated based upon movement of the user of the wearable audio device.

15. The computing device of claim 11, wherein the first localized audio message is prioritized based upon an interaction of the user with a user interface provided by the wearable audio device.

16. The computing device of claim 11, wherein the first localized audio message is prioritized based upon a predefined limit of localized audio messages to be received by the wearable audio device.

17. The computing device of claim 11, wherein the first localized audio message 1s prioritized based upon a language spoken by the user of the wearable audio device.

18. The computing device of claim 11, wherein the first localized audio message is prioritized based upon one or more habits of the user of the wearable audio device as determined by a machine-learning process.

19. The computing device of claim 11, wherein the gaze direction is determined using one or more of an accelerometer, a gyroscope, and a magnetometer.

* * * * *